United States Patent [19]
Teterwak

[11] Patent Number: 6,081,259
[45] Date of Patent: Jun. 27, 2000

[54] METHOD AND APPARATUS FOR REDUCING NOISE IN AN ELECTROSTATIC DIGITIZER

[75] Inventor: Jerzy A. Teterwak, Colorado Springs, Colo.

[73] Assignee: LSI Logic Corporation, Milpitas, Calif.

[21] Appl. No.: 08/978,394

[22] Filed: Nov. 25, 1997

[51] Int. Cl.[7] .................................................. G08O 21/06
[52] U.S. Cl. ...................... 345/173; 345/179; 178/18.01; 178/18.03
[58] Field of Search ............................ 178/18.01, 18.03, 178/18.05, 18.06, 18.07, 18.08, 19.01, 19.02, 19.03; 345/173, 179

[56] References Cited

U.S. PATENT DOCUMENTS

| | | | |
|---|---|---|---|
| 4,435,616 | 3/1984 | Kley | 178/18 |
| 4,497,977 | 2/1985 | Saito et al. | 178/19.01 |
| 4,665,283 | 5/1987 | Kable et al. | 178/19 |
| 4,678,869 | 7/1987 | Kable | 178/19 |
| 4,853,493 | 8/1989 | Schlosser et al. | 178/18 |
| 4,859,814 | 8/1989 | Sciacero et al. | 178/18.07 |
| 5,218,174 | 6/1993 | Gray et al. | 178/19 |
| 5,239,489 | 8/1993 | Russell | 364/560 |
| 5,554,828 | 9/1996 | Primm | 178/18 |
| 5,574,262 | 11/1996 | Petty | 178/19.01 |
| 5,837,947 | 11/1998 | Teterwak | 178/18.01 |
| 5,859,392 | 1/1999 | Petty | 178/18.01 |
| 5,889,511 | 3/1999 | Ong et al. | 345/173 |
| 5,902,967 | 5/1999 | Teterwak | 178/18.01 |

Primary Examiner—Bipin Shalwala
Assistant Examiner—Vincent E. Kovalick

[57] ABSTRACT

An electrostatic digitizing panel capable of filtering offset loads such that stylus or fingertip position information is more accurately obtained. The present invention utilizes a new method of calculating the stylus position such that the digitizer surface is sensitive only to the electric field concentrated in the area occupied by the stylus or fingertip. Thus, the panel has a substantially reduced sensitivity to fields emitted from a user's hand or noise fields emitted from the surface of a display, or the like, coupled to the panel.

23 Claims, 8 Drawing Sheets

METHOD AND APPARATUS FOR REDUCING NOISE IN AN ELECTROSTATIC DIGITIZER

CROSS-REFERENCES

The following co-pending and co-owned United States patent applications are incorporated herein by reference: (1) *Cancellation of Common-Mode Signals in Digitizing Tablet*, U.S. patent application Ser. No. 08/192,078 (filed Feb. 4, 1994); (2) *Compensation of Stylus Signals in Digitizing Tablet*, U.S. patent application Ser. No. 08/286,720 (filed Aug. 5, 1994); and *Method for Reducing Flat Panel Display Horizontal Scan Signal Interference in the Electrostatic, Pen Operated Digitizer*, U.S. patent application Ser. No. 08/904,735 (filed Aug. 1, 1997).

BACKGROUND OF THE INVENTION

A. Field of the Invention

The present invention is generally related to electrostatic digitizers, and more particularly related to a method and apparatus for reducing noise in an electrostatic digitizer adapted to accept input via a pen or stylus or a user's fingertip.

B. Description of the Prior Art

Hand effect in an electrostatic digitizing panel causes a significant change in the pen or fingertip position recognized by the system when a user's hand (usually the one which holds the pen) gets close to the panel surface. This change of position is caused by the additional current injected to the panel by the user's hand being excited by the pen's electric field. Generally, the current flows in a closed circuit. Accordingly, the path of the current injected from a stylus to the panel is closed. Ideally, the path would close through the stylus capacitance to the earth ground. However, part of the return current flows back through the panel surface. The presence of the hand increases the amount of current following this path and distorts the original distribution of the current. This change may cause a significant error in the stylus position reported by the system.

Known to the art are both a method of increasing the thickness of the panel and a method of depositing a conductive indium-tin-oxide ("ITO") grid on the top surface of the panel. Increasing the thickness of the panel decreases the coupling between the hand resting on the panel and the resistive sensing layer deposited on the bottom side of the panel. Depositing an ITO grid on the top surface of the panel shields off some of the field emitted from the hand and provides a conductive pathway between the hand resting on the panel and ground. Both methods have limited effectiveness and introduce undesirable side effects such as increased panel thickness and visible grid lines on the panel surface.

A second problem encountered in the use of electrostatic digitizers is their sensitivity to electric and magnetic noise. Electric and magnetic noise may be emitted, for example, from the surface of a flat panel display on which the digitizer is mounted or by other system components such as a backlight converter. This noise may also distort the original distribution of the current and cause an error is the stylus or fingertip position reported by the system.

Accordingly, it would be advantageous to provide a method and an apparatus for reducing noise in an electrostatic digitizer caused by hand effect or sensitivity to electric or magnetic fields.

SUMMARY OF THE INVENTION

It is, therefore, a primary object of the present invention to provide a method and an apparatus for reducing noise in an electrostatic digitizer caused by hand effect or sensitivity to electric and magnetic fields.

Another object of the present invention is to provide a method and apparatus for sampling currents injected at a selected area of an electrostatic digitizer to provide increased accuracy in determining the position where the user's stylus or fingertip contacts the panel.

Yet another object of the present invention is to provide a method for manufacturing an electrostatic digitizer having apparatus for reducing noise caused by hand effect or sensitivity to electric and magnetic fields.

The present invention teaches an electrostatic digitizing panel particularly sensitive to currents injected by a pen, stylus, or the like. Since the panel is not sensitive to widely distributed currents it cancels noise and hand effects thereby providing for more accurate position determinations.

In operation the present invention first modifies the configuration of the digitizing panel and then utilizes a new method of calculating the stylus or fingertip position. This new method of calculating the stylus or fingertip position acts such that the digitizer surface is sensitive only to the electric field concentrated in the area occupied by the stylus or fingertip. Thus, the panel has a substantially reduced sensitivity to fields emitted from a user's hand or noise fields emitted from the surface of a display, for example, coupled to the panel.

BRIEF DESCRIPTION OF THE DRAWINGS

A preferred embodiment of the present invention is described hereafter, by way of example only, with reference to the accompanying drawings in which:

FIGS. 4A and 4B are graphical illustrations of stylus position mapping wherein FIG. 4A illustrates vertical line mapping and FIG. 4B illustrates horizontal line mapping; and FIGS. 5A and 5B are graphical illustrations of an exemplary embodiment of a presently preferred implementation of the present invention wherein FIG. 5A illustrates means for utilizing phase shifters for measuring corner currents and wherein FIG. 5B illustrates an exemplary circuit adapted to perform an exemplary phase shift function.

DETAILED DESCRIPTION

Figure 1:
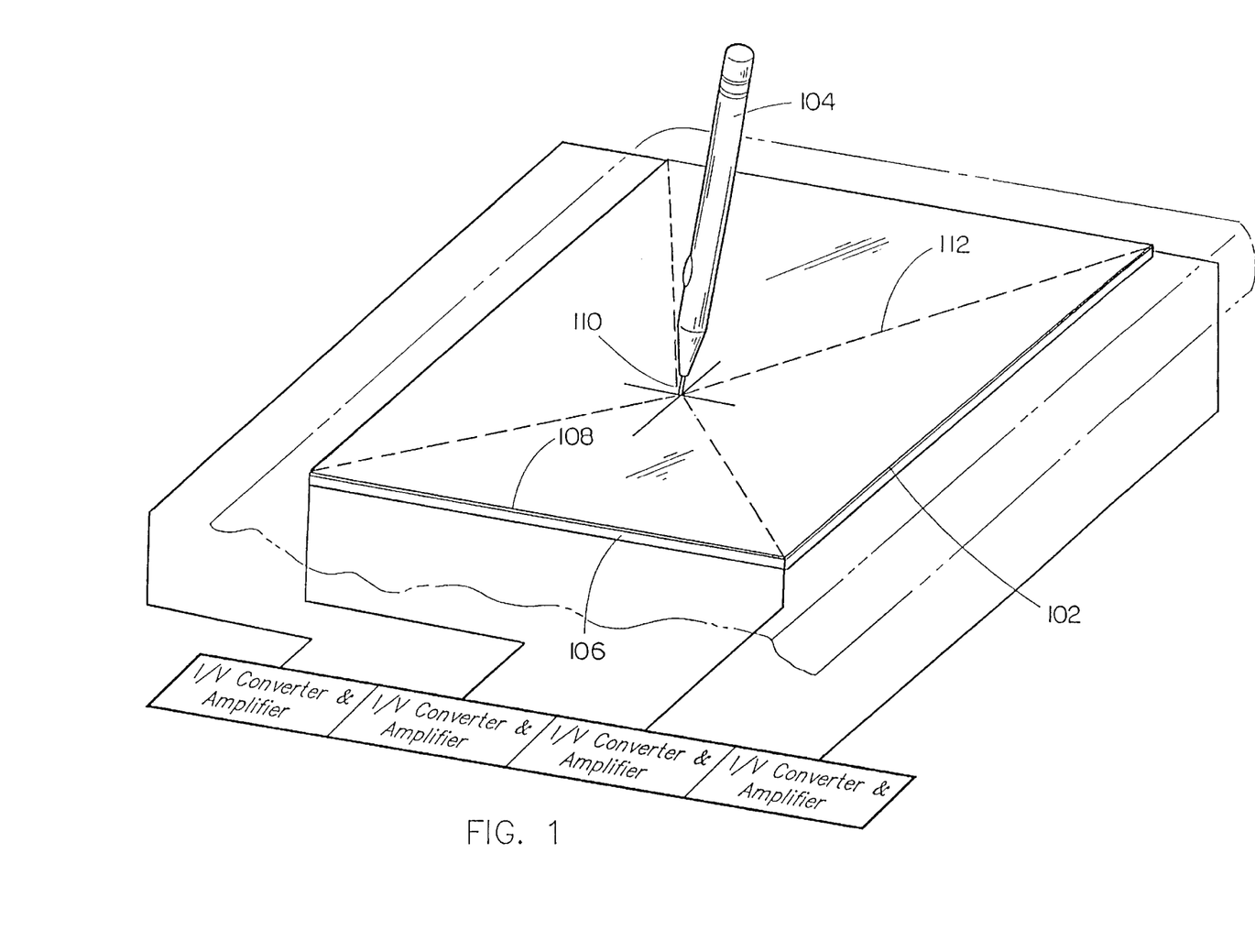
FIG. 1 is a diagrammatic perspective drawing illustrating the components of a display/digitizer system.

The present invention teaches an electrostatic digitizing panel particularly sensitive to currents injected by a pen, stylus, or the like. Preferably, the panel is not sensitive to widely distributed currents thereby canceling noise and hand effects and providing for more accurate position determinations. As shown in FIG. 1, a typical electrostatic digitizing panel 102 may be built out of a plate 106 having a resistive layer covered with a nonconductive layer 108. The digitizing panel 102 may accept user input via a pen or stylus 104, or, alternatively, via a user's fingertip (when in "touch mode"). A pen or stylus 104 utilized with the present system may include a built in ac voltage source with an output connected to the stylus tip 110. When the stylus tip 110 touches the plate 106 it capacitively couples to the resistive layer causing electric current to flow to the corners of the panel 102 as indicated by dashed lines 112. The position where the stylus tip 110 contacts the digitizing panel 102 may then be determined based on a ratio of the corner currents injected by the stylus 104. Alternatively, in touch mode, the resistive layer of the plate 106 may be biased with a voltage. The position where the user's fingertip (not shown) touches the panel 102 may be determined based on a ratio of the measured corner currents which, in this case, are the additional currents required to feed the added finger capacitance.

Two major obstacles limit the accuracy of the digitizing panel described above: first, the presence of so called hand effect in the panel, and second, the panel's sensitivity to electric and magnetic noise. Hand effect in an electrostatic digitizing panel may cause a significant change in the stylus or fingertip position recognized by the system when a user's hand (usually the one which holds the pen) gets close to the panel surface. This change of position is caused by the additional current injected to the panel by the user's hand being excited by the pen's electric field. Generally, the current flows in a closed circuit. Accordingly, the path of the current injected from the stylus to the panel is closed. Ideally, the path would close through the stylus capacitance to the earth ground. However, part of the return current flows back through the panel surface. The presence of the hand increases the amount of current following this path and distorts the original distribution of the current. This change may cause a significant error in the stylus or fingertip position reported by the system. Further, electric and magnetic noise may be emitted from the surface of a flat panel display on which the digitizer is mounted or by other system components such as a backlight converter. This noise may also distort the original distribution of the current and cause an error is the stylus or fingertip position reported by the system.

Figure 2:
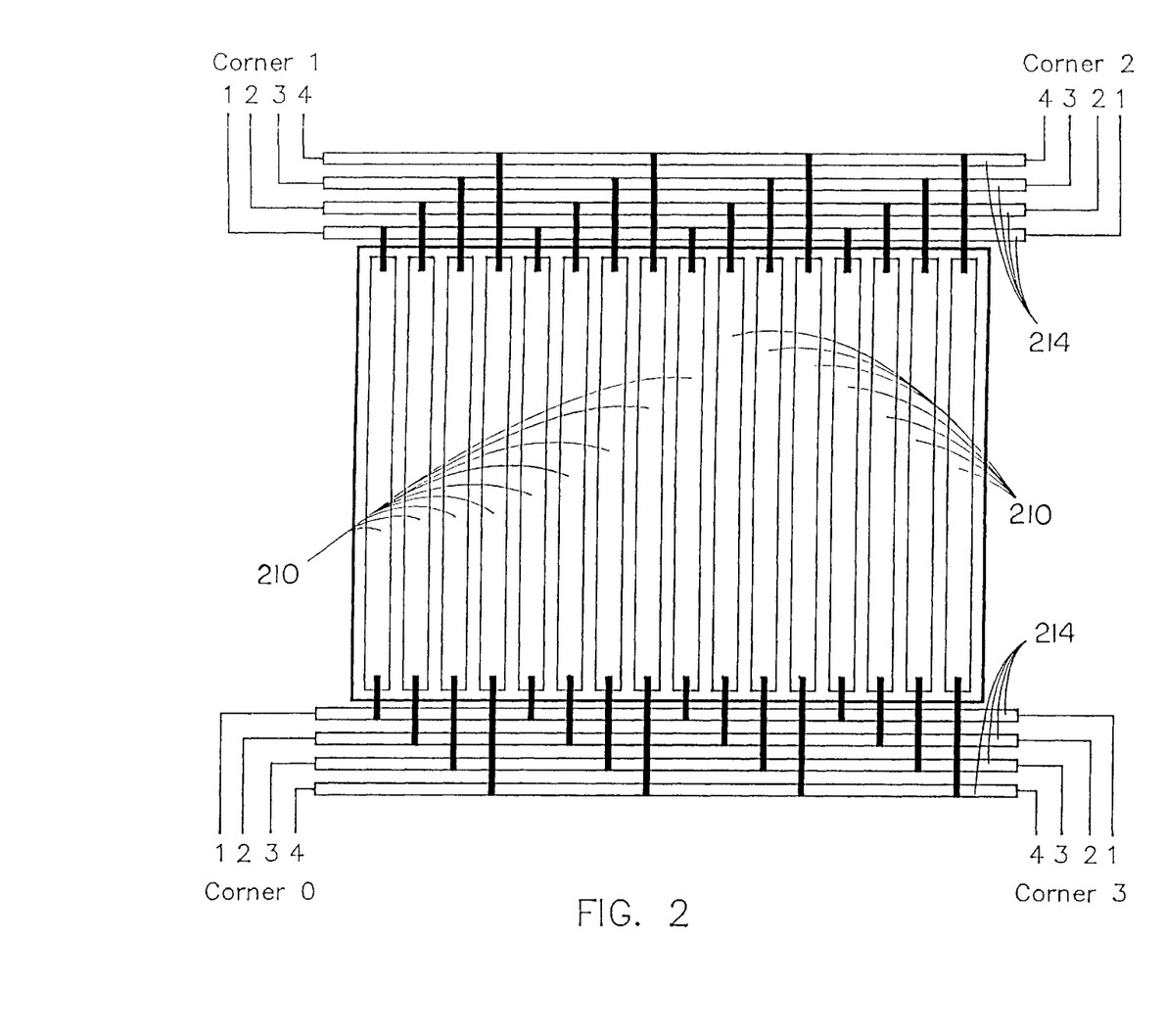
FIG. 2 is a diagram illustrating an exemplary construction of a digitizing panel according to a preferred embodiment of the present invention.
Figure 3A:
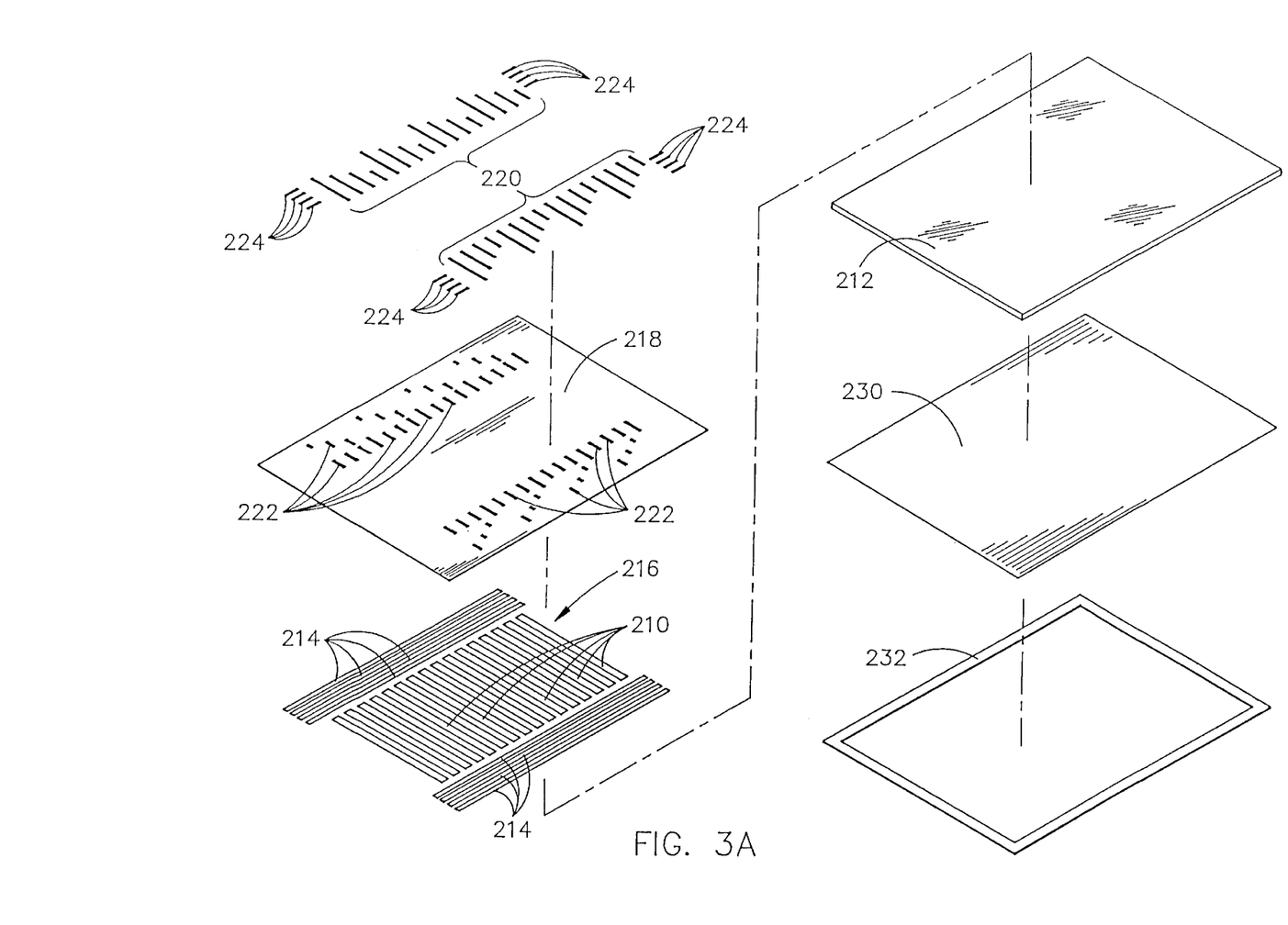
FIGS. 3A and 3B are exploded perspective views illustrating the assembly of a digitizing panel according to exemplary embodiments of the present invention.

Referring now to FIG. 2, the present invention solves the problems of hand effect and sensitivity to electric and magnetic noise by changing the digitizing panel sensing layer arrangement. The digitizing panel's resistive or sensitive layer is preferably built out of a plurality of generally parallel vertical resistive members 210. These resistive members 210 may be formed of indium-tin-oxide ("ITO") deposited (or formed using other suitable means) on a non-conductive plate surface such as glass or the like 212 (FIG. 3). For illustration purposes, FIG. 2 shows 16 members, however, in a preferred embodiment 40 members may be employed. Preferably, the number of members is an integer multiple of 4.

The vertical members 210 may be connected to two sets of four horizontal resistive members 214. These horizontal resistive members 214, like the vertical resistive members 210, may be formed of ITO deposited (or formed using other suitable means) on the surface of the non-conductive plate 212. Metallic connections between the horizontal and vertical members (shown as heavy black lines in FIG. 2) may couple each vertical member with only one pair of horizontal members and may bridge over any crossed horizontal member.

As shown in FIG. 2, the vertical members may be grouped into four interleaving groups. In a preferred embodiment, the output signal from the digitizing panel may be collected at the ends of the horizontal members by four connections or wires connected to each corner of the digitizer. The connections for each of the panel's four corners are numbered "1" through "4" respectively in FIG. 2. Thus, the total number of connections or wires required to receive the signal from the exemplary panel described herein is sixteen (16). If current is injected across a large area of the panel, as is typical of hand effect current injection and noise injection, the current injected to each of the four groups of interleaved vertical members will have roughly the same amplitude and will cancel each other. However, if the current is injected to a small area, for example, from the stylus tip, one of the four groups of interleaved members will receive a significantly stronger signal than the others and cancellation will not occur. In this manner, the electrostatic digitizing panel may be made particularly sensitive to currents injected by a pen or stylus and relatively insensitive to widely distributed currents such as noise and hand effects, thereby providing more accurate position determinations.

Figure 3B:
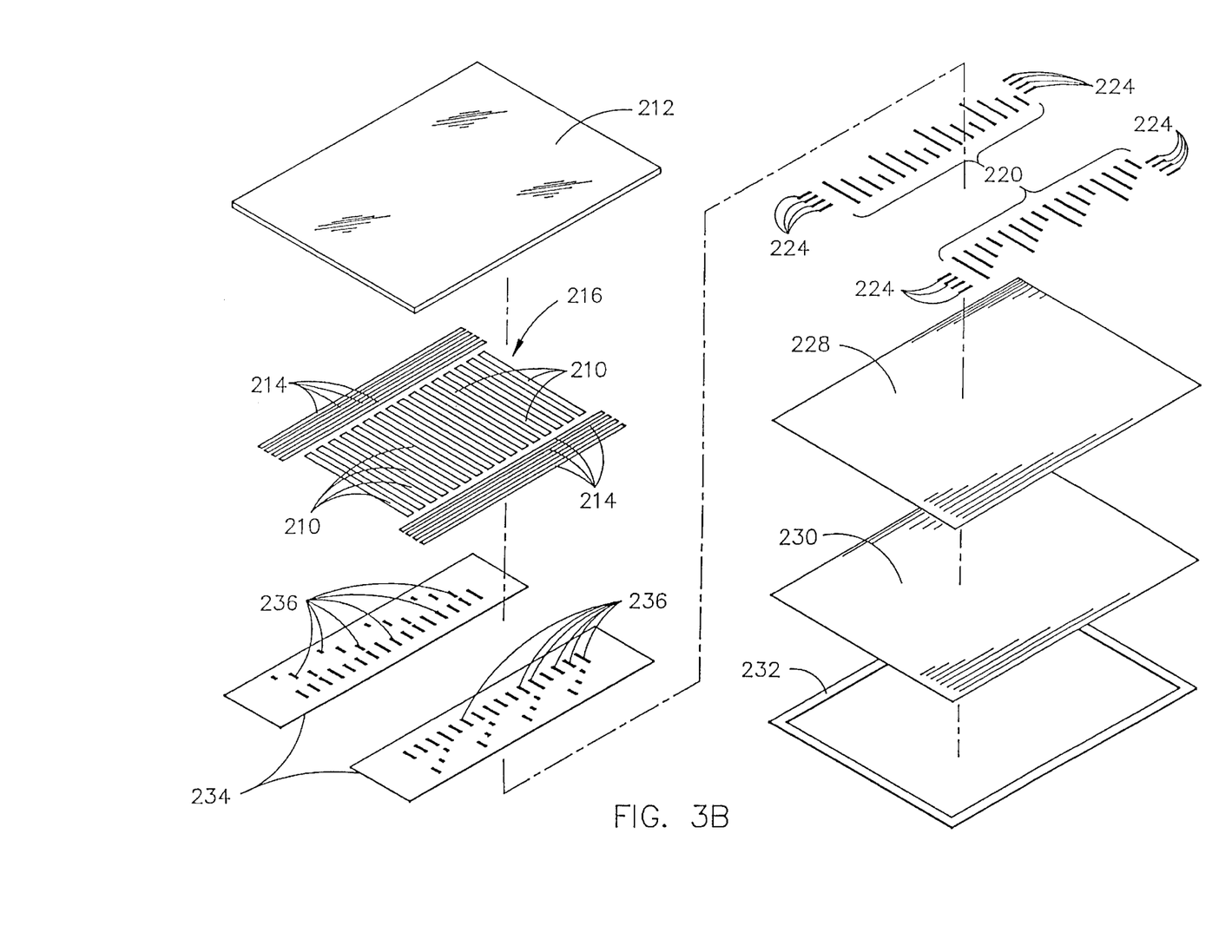

In an exemplary embodiment, the present invention may be constructed from and include, for example, a SYM93C2000 Interface Controller, available from Symbios Logic, Colorado Springs, Colo. This controller may be modified to include input phase shifters (FIGS. 5A and 5B) and connected to a digitizing panel constructed in the way described in the present invention (FIGS. 2, 3A and 3B). The SYM93C200 Interface Controller is capable of detecting stylus events by measuring the corner currents injected by the stylus. Differences in the corner currents reveal the location directly under the tip of the stylus. In touch mode, an active indium-tin-oxide ("ITO") sensor may be biased with a voltage. The position where the user's fingertip touches the panel may be determined based on a ratio of the measured corner currents which, in this case, are the additional currents required to feed the added finger capacitance. In a typical arrangement, prior to the present invention, the sensor panel includes a glass writing surface with an under coating of indium-tin-oxide ("ITO"). Preferably, a polyester spall shield is attached over the ITO coating in order to prevent shattering if the glass is broken. The underside of the shield may be coated with a grounded ITO layer in order to shield the sensor from electrical noise produced by the LCD. The top layer of the glass writing surface is provided with a grounded fine grid ITO coating pattern in order to eliminate hand effects. The active ITO layer is slightly resistive and divides the stylus (or finger) current among four corner wires. The corner current signals carried by these wires are proportional to the ITO conductivity between each individual corner and the fingertip location.

In operation, an exemplary embodiment of the present invention may be constructed with a computer, for example, having an IBM PC type architecture and a stylus and/or touch driven screen connected to the computer as an I/O device. The stylus and/or touch driven screen may be, for example, a Symbios Logic SYM93C2000 controller with added input phase shifter circuits (FIGS. 5A and 5B) connected to a digitizing panel constructed in the way described in the present invention (FIGS. 2, 3A and 3B). A software driver may interface the SYM93C2000 controller to an operating system such as Microsoft® Windows® 95. The software driver preferably adheres to Windows® 95 user interface conventions and provides options that allow the user to set personal preferences such as touch-down and touch-release sensitivity, multiple-touch for emulating a right-mouse button, absolute or relative touch, and the like. Further, the computer may operate application environment software such as, for example, Microsoft® WinPad®. While the Symbios Logic SYM93C2000 controller provides one possible implementation of the system of the present invention, it will be appreciated by those skilled in the art that a system of the present invention may be assembled which utilizes any electronics circuitry performing necessary corner current measurement, stylus/touch position computation, and providing the interface to the computer system.

Turning now to FIG. 3A, the assembly of a digitizer according to an exemplary embodiment of the present invention is shown. An ITO coating pattern 216 may be deposited on the top surface of a glass plate 212 to form the vertical and horizontal resistive members 210 & 214. Preferably, the individual resistive members 210 & 214 may be patterned to control the member resistance. For example, in a panel having eighty (80) vertical members, a typical horizontal member resistance may be 1 kohm and a typical vertical member resistance may be 6 kohm. The top surface of the panel may be covered with a thin dielectric layer 218 such as a ceramic deposition, for example, which may protect and electrically insulate the ITO coating pattern layer 216. The dielectric layer 218 may also form an insulator layer to bridge the vertical member-to-horizontal member connections 220 over the horizontal members 214 they cross. The vertical member-to-horizontal member connections 220 may be made by masking the dielectric deposition in the locations 222 where the vertical member-to-horizontal member connections 220 connect to the vertical and horizontal resistive members 210 & 214 and then depositing a conductive material such as silver, gold, or copper to form a connection. Metallic corner connections 224 may be formed from silver, gold, or copper deposited in the same manner. To further reduce noise coupling from the LCD, the bottom side of the glass plate 212 may be covered with an ITO layer 230. Preferably, this layer 230 is grounded so that it provides electrical shielding between the LCD and the active layers of the panel. For example, the ITO layer 230 may be grounded via a conductive material such as silver, gold, or copper deposited over the ITO layer 230 to form a rim 232 along the perimeter of the glass plate 212.

As shown in FIG. 3B, the digitizing panel may have an alternative configuration wherein the ITO coating pattern 216 may be deposited on the bottom surface of the glass plate 212 to form the vertical and horizontal resistive members 210 & 214. In this configuration, the writing surface is a top surface of the glass plate 212 which is not coated with ITO. Therefore, no protective ceramic deposition is required. After the deposition of the ITO coating pattern layer 216, a dielectric layer 234 may be placed over the horizontal members 214. This layer 234 may function as an insulation layer to bridge the vertical member-to-horizontal member connections 220 over the horizontal members 214 they cross. In this embodiment, however, the dielectric layer 234 does not have to be transparent because it is not placed in the digitizer active area. Thus, materials such as Kapton foil or the like may be attached to the bottom surface of the glass plate to serve as a dielectric layer 234. Openings 236 may be formed in the foil in the locations where each vertical member-to-horizontal member connection 220 will connect to a vertical or horizontal resistive member 210 & 214. The vertical member-to-horizontal member connections 220 may then be formed by depositing a conductive material such as silver, gold, or copper over the dielectric layer 234. Metallic corner connections 224 may be formed of silver, gold, or copper deposited in a similar manner. A polyester spall shield 228 may be attached to the bottom of the glass plate 212 over the ITO coating pattern and dielectric layers 216 & 234 to prevent the glass plate 212 from shattering if it is broken. The bottom side of the spall shield 228 may be covered with an ITO layer or coating 230. This ITO layer 230 may be grounded so that it provides electrical shielding between the LCD and the active layers of the panel. For example, a conductive material such as silver, gold, or copper may be deposited over the ITO layer 230 to form a rim 232 along the perimeter of the spall shield 228.

Preferably, the conductive rim 232 provides a good ground connection for the ITO layer 230 deposited on the spall shield 228.

Figure 4A:
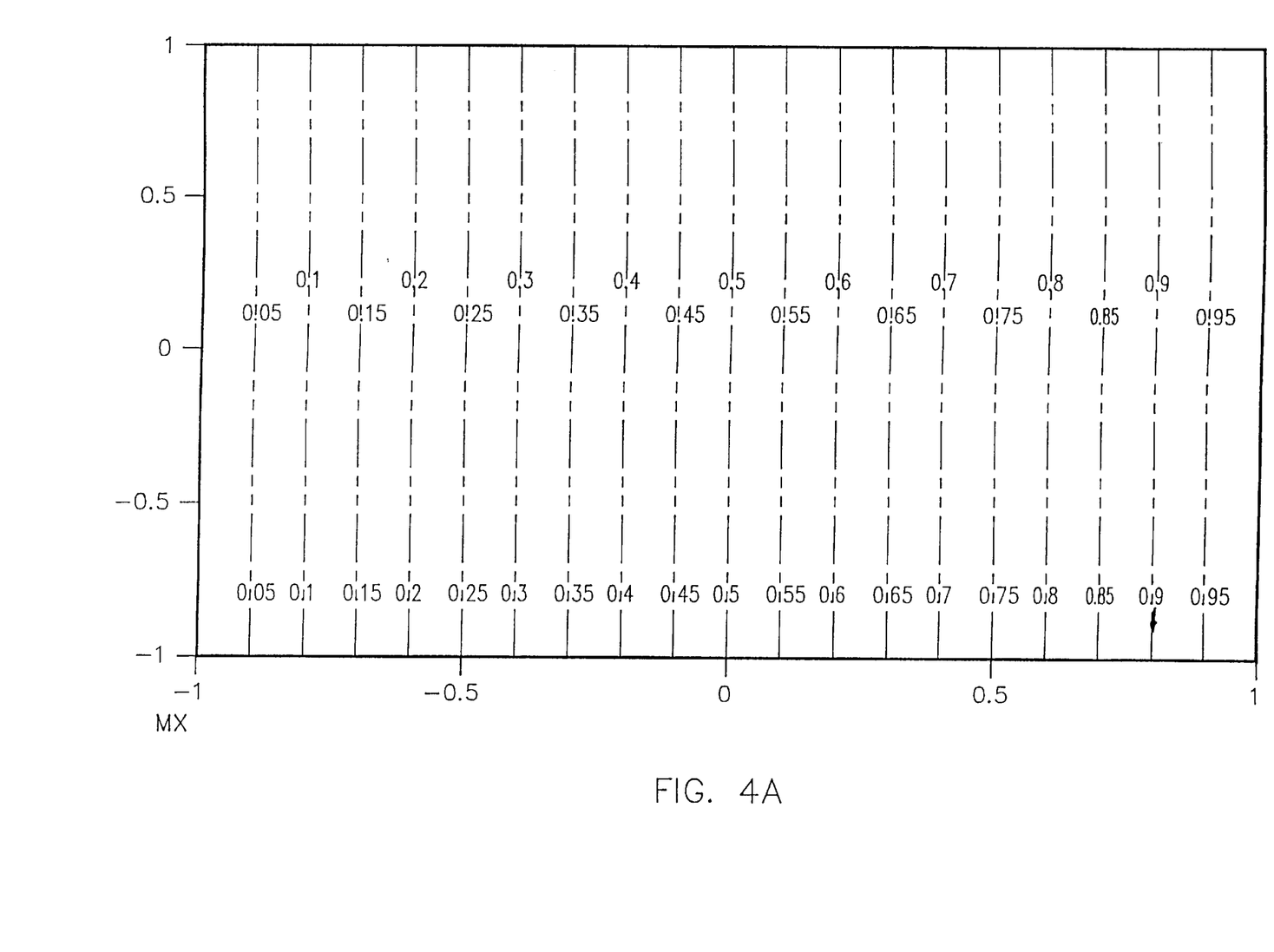
Figure 4B:
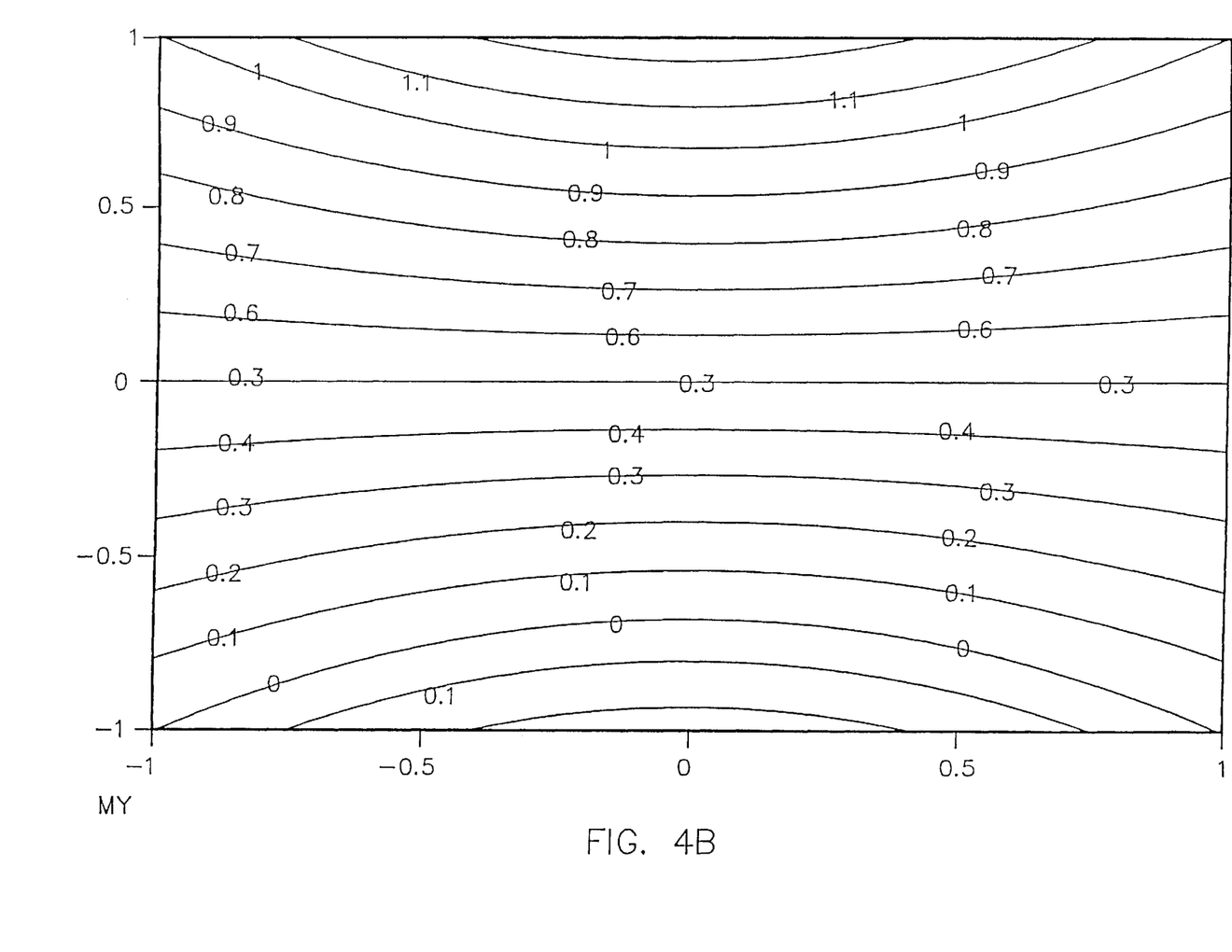

In operation, stylus position may be determined based on the ratio of the effective current amplitudes at the four corners of the panel. These corners are designated "Corner 0", "Corner 1", "Corner 2", and "Corner 3" in FIG. 2. The effective current amplitude is derived from the individual currents flowing in each of the four connections or wires connected to a single corner. The current ratio depends on the stylus position since the current injected from the stylus tip will split in the resistive network formed by the resistive members (ITO strips). In particular, Y (vertical) position is determined by the current divider formed by the vertical members 210 and X (horizontal) position is determined by the current divider formed by horizontal members 214 (FIG. 2). The X and Y coordinates may be calculated using the following formulas:

$$X = \frac{i2 + i3}{i0 + i1 + i2 + i3}$$

and $$Y = \frac{i1 + i2}{i0 + i1 + i2 + i3}$$

where i0, i1, i2, and i3 are the effective currents measured at corners 0 through 3 respectively. The coordinates calculated in this fashion provide distorted mapping of the actual stylus coordinates. The coordinate mapping is shown in FIGS. 4A and 4B. FIG. 4A shows the mapping of vertical lines drawn on the panel. FIG. 4B shows the mapping of horizontal lines drawn on the panel. The amount of cushion effect (illustrated in FIG. 4B) depends on both (1) the ratio of the resistance of the horizontal and vertical members and (2) the number of vertical members connected to one pair of horizontal members. In the example shown, the number of vertical members was ten (10) and the horizontal member resistance was equal to one third of the vertical member resistance. The resistance of the resistive members may be controlled by depositing the resistive material, for example, ITO as a pattern rather than a combination layer. The position mapping distortion may be corrected using known correction lookup table techniques.

In the described exemplary embodiment the corner current values i0 and i3 may be derived from the currents measured in the four connections or wires connected to a single corner using the following formula:

$$i_k = \sqrt{(i_{k1} + i_{k2} - i_{k3} - i_{k4})^2 + (i_{k2} + i_{k3} - i_{k1} - i_{k4})^2}$$

where $i_{k1}$, $i_{k2}$, $i_{k3}$, and $i_{k4}$ are the amplitudes of the current measured at the k-th corner in connection or wire 1 through 4 respectively (FIG. 2).

It will be appreciated that if the current injection to four groups of vertical members has the same amplitude the effective current amplitudes i0 and i3 will be equal to zero. This situation occurs when the current is injected across a large area of the panel and is typical to noise injection and hand effect current injection. If the current is injected to a small area, for example, from the stylus tip, one of the four member groups will receive a significantly stronger signal and cancellation will not occur. It is important that the method utilized to calculate the effective current amplitude ensures that for the currents injected into the small area the overall strength of signal (sum of four corner signals) will not depend on the stylus position.

Figure 5A:
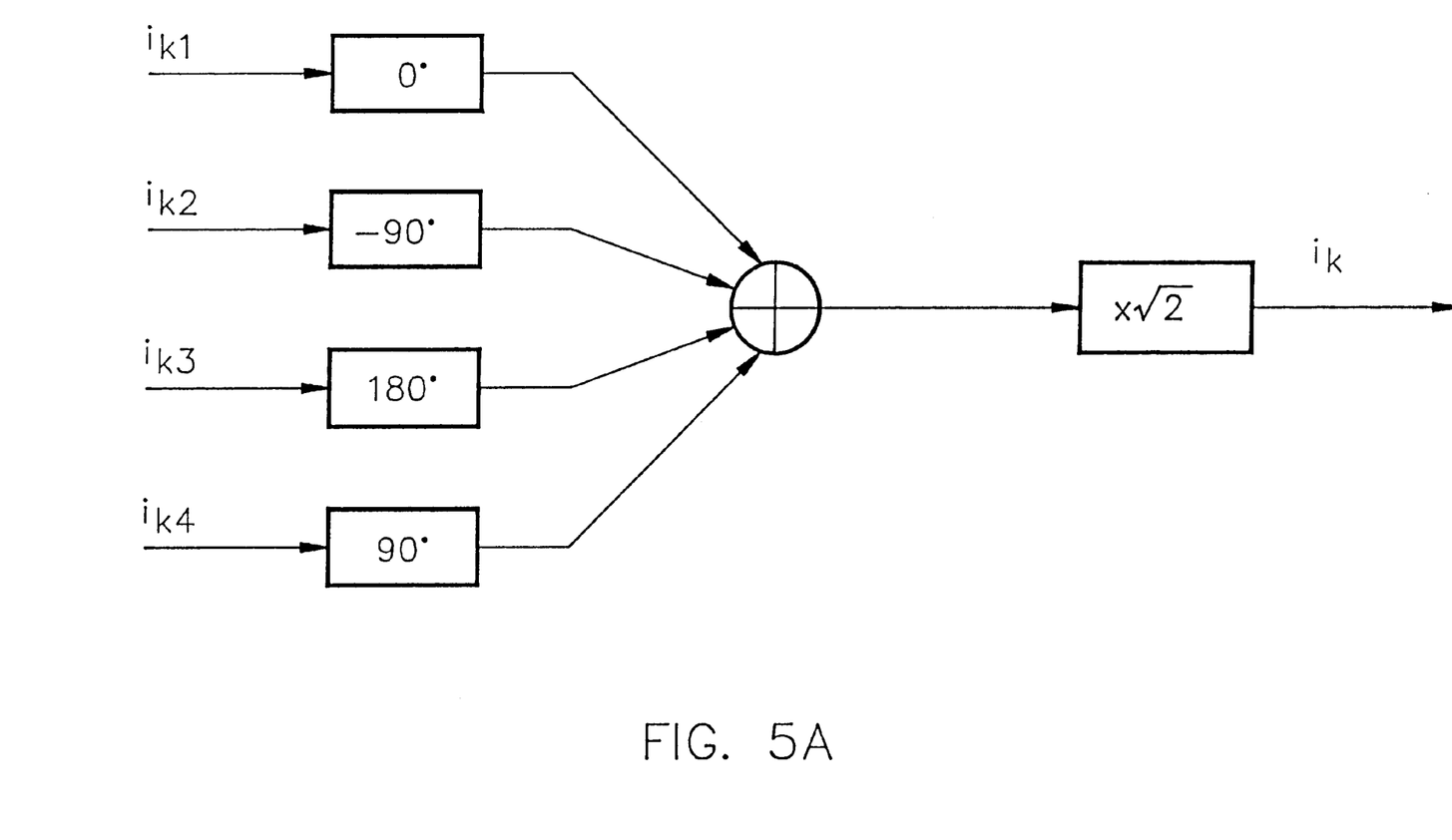

In a direct implementation of a preferred embodiment of the present invention the electronics of the digitizing panel may have four (4) analog channels and four A/D converters for each panel corner. The A/D output represents $i_{k1}$, $i_{k2}$, $i_{k3}$, and $i_{k4}$ and the necessary calculations may be made in firmware. A less hardware intensive embodiment may be implemented if the phase of currents $i_{k1}$, $i_{k2}$, $i_{k3}$, and $i_{k4}$ are shifted and then summed and multiplied by the square root of two (the resulting amplitude is equal to $i_k$) (FIG. 5A). According to the embodiment shown in FIG. 5A, the phase of current $i_{k1}$ may be shifted by 0°, the phase of current $i_{k2}$ may be shifted by −90°, the phase of current $i_{k3}$ may be shifted by 180°, and the phase of $i_{k4}$ may be shifted by 90°. The shifted currents, $i_{k1}$, $i_{k2}$, $i_{k3}$, and $i_{k4}$ may then be summed and multiplied by the square root of two ($\sqrt{2}$) resulting in current $i_k$. Since the multiplication of the signal by the square root of two ($\sqrt{2}$) does not affect the computed position (since position computation is ratio based) the square root of two ($\sqrt{2}$) gain block may be eliminated in some implementations.

Figure 5B:
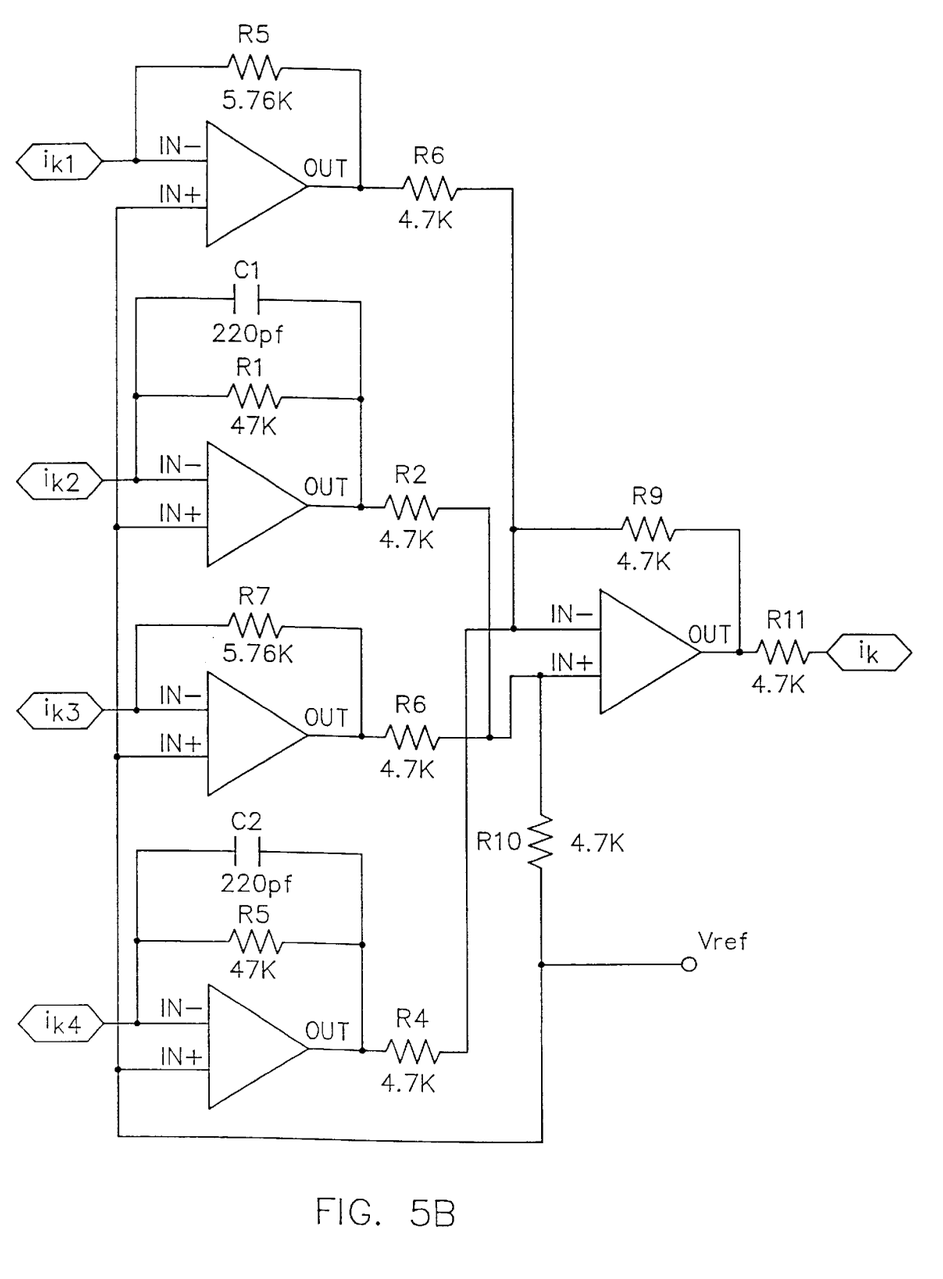

An exemplary embodiment of a circuit designed to perform the desired phase shift function is illustrated in FIG. 5B. The component values have been optimized for a 125 kHz signal frequency. The schematic shows circuitry for one corner of the digitizing panel (circuits for the remaining corners are identical). Preferably, the phase shifter circuits may, for example, be added to an existing interface controller, such as the Symbios Logic SYM93C2000 Interface Controller described herein, to perform the desired calculations.

The described digitizing panel may be rotated to use horizontal members in the active area of the digitizer and vertical members at the right and left edge. As previously noted, the panel may also be used for touch detection. In a preferred touch mode of operation, all sixteen (16) corner connections or wires may be driven with an ac reference signal. Fingertip detection is possible since the fingertip adds load to the panel and causes the corner currents to increase. The ratio of the corner current change may then be utilized to calculate the fingertip position in the same manner as the corner currents are used to determine stylus position. In this manner, the digitizer may determine the position of a user's fingertip touching the panel.

Various advantages of the present invention will be apparent to those skilled in the art. For example, the present invention provides a method of canceling noise and offset loads (caused by conductive grounded objects located close to the panel), and allows touch detection based on the load added by the fingertip (rather than a combination of fingertip and hand load).

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. An electrostatic stylus or fingertip driven digitizing panel, comprising:
    a generally rectilinear non-conductive surface;
    a plurality of first non-overlapping resistive members each of said members having a first and a second end, said members forming an array overlaying said generally rectilinear non-conductive surface so as to form an active region on said generally rectilinear non-conductive surface;
    a plurality of second non-overlapping resistive members forming a second array generally perpendicular to said first end of said first array members and operably electrically coupled with said first array members, said second array not overlaying said active region of said generally rectilinear non-conductive surface; and
    a plurality of third non-overlapping resistive members forming a third array generally perpendicular to said second end of said first array members and operably electrically coupled with said first array members, said third array not overlaying said active region of said generally rectilinear non-conductive surface.

2. The electrostatic stylus or fingertip driven digitizing panel apparatus of claim 1 wherein the number of second non-overlapping resistive members is equal to one fourth (¼) the number of first non-overlapping resistive members and wherein the number of third non-overlapping resistive members is equal to one fourth (¼) the number of first non-overlapping resistive members.

3. The electrostatic stylus or fingertip driven digitizing panel apparatus of claim 2 wherein there are at least sixteen (16) first non-overlapping members.

4. The electrostatic stylus or fingertip driven digitizing panel apparatus of claim 2 wherein there are at least four (4) second non-overlapping members and wherein there are at least four (4) third non-overlapping members.

5. The electrostatic stylus or fingertip driven digitizing panel apparatus of claim 1 wherein said first, second, and third array members are formed of indium-tin-oxide ("ITO") strips.

6. The electrostatic stylus or fingertip driven digitizing panel apparatus of claim 5 further comprising a layer for insulating said indium-tin-oxide ("ITO") strips.

7. The electrostatic stylus or fingertip driven digitizing panel apparatus of claim 6 wherein said layer for insulating is a dielectric layer.

8. The electrostatic stylus or fingertip driven digitizing panel apparatus of claim 7 wherein said layer for dielectric layer is formed of a ceramic composition.

9. A method for reducing noise in a digitizing panel, comprising:
    obtaining an output current value of the digitizing panel wherein the digitizing panel has an active region where coordinate data may be obtained and wherein corner current values are divided by a first array of non-overlapping resistive members acting to substantially cover the active region and a second array of non-overlapping resistive members not covering the active region, the second array operably connected to the first array, and wherein the output current value includes position current corresponding to the position of a stylus in contact with the digitizing panel and noise current corresponding to offset load currents conducting through grounded pathways; and
    filtering the offset load current from the corner current values whereby the position of a stylus being in contact with said panel may be given as a function of the output current value.

10. The method of claim 9 wherein said second array has an output for each of said digitizing panel corners and the output of each of said corner output is split into a number equal to the number of panel corners.

11. The method of claim 10 wherein said digitizing panel has four corners and wherein said second array splits each of said four corner currents into four corner current values and wherein each of said four current values for each of said four corner currents is phase shifted such that four phase shifted signals corresponding to each of said four corner current values is obtained and wherein each of said four phase shifted signals corresponding to each of said four corner current values for each panel corner is summed and multiplied by the square root of two so as to obtain four values each of said four values corresponding to the current value at one corner of the digitizing panel.

12. An electrostatic digitizer assembly having an active region adapted to accept input from a stylus or a fingertip, said digitizer assembly comprising:

a generally rectilinear non-conductive surface;

a first array of non-overlapping resistive members overlaying said generally rectilinear non-conductive surface, said first array acting to substantially cover said active region;

a second array of non-overlapping resistive members overlaying said generally rectilinear non-conductive surface wherein said second array does not cover said active region, said second array operably electrically coupled to said first array wherein said first and second array are adapted to provide digitizing panel corner current values including position providing current consisting essentially of current injected by at least one of a fingertip and a stylus in contact with said digitizing panel and noise current consisting essentially of offset load currents from conductive grounded objects; and a circuit for filtering at least part of said noise current from said corner current values so as to determine the position of at least one of a fingertip and a stylus in contact with said digitizing panel wherein said position of said at least one of a fingertip and a stylus in contact with said digitizing panel is given by said position providing current.

13. The digitizer assembly of claim 12, wherein said first and second arrays of non-overlapping resistive members are formed of indium-tin-oxide ("ITO") strips.

14. The digitizer assembly of claim 12, further comprising a layer for insulating said first and second arrays of non-overlapping resistive members.

15. The digitizer assembly of claim 14, wherein said layer for insulating is a dielectric layer.

16. The digitizer assembly of claim 15, wherein said dielectric layer is formed of a ceramic composition.

17. The digitizer assembly of claim 12, further comprising a layer for insulating said second array of non-overlapping resistive members.

18. The digitizer assembly of claim 17, wherein said layer for insulating comprises Kapton foil.

19. The digitizer assembly of claim 12, further comprising a grounded electrical shielding layer adapted to provide electrical shielding to said first and second arrays.

20. The digitizer assembly of claim 19, wherein said electrical shielding layer is comprised of indium-tin-oxide ("ITO").

21. The digitizer assembly of claim 12, further comprising a spall shield mounted to said generally rectilinear non-conductive surface, said spall shield including a grounded electrical shielding layer adapted to provide electrical shielding to said first and second arrays.

22. The digitizer assembly of claim 21, wherein said electrical shielding layer is comprised of indium-tin-oxide ("ITO").

23. A computer having an electrostatic digitizer assembly including an active region adapted to accept input from a stylus or a fingertip, said digitizer assembly comprising:

a generally rectilinear non-conductive surface;

a first array of non-overlapping resistive members overlaying said generally rectilinear non-conductive surface, said first array acting to substantially cover said active region;

a second array of non-overlapping resistive members overlaying said generally rectilinear non-conductive surface wherein said second array does not cover said active region, said second array operably electrically coupled to said first array wherein said first and second array are adapted to provide digitizing panel corner current values including position providing current consisting essentially of current injected by at least one of a fingertip and a stylus in contact with said digitizing panel and noise current consisting essentially of offset load currents from conductive grounded objects; and a circuit for filtering at least part of said noise current from said corner current values so as to determine the position of at least one of a fingertip and a stylus in contact with said digitizing panel wherein said position of said at least one of a fingertip and a stylus in contact with said digitizing panel is given by said position providing current.

* * * * *